United States Patent [19]

Hobson et al.

[11] Patent Number: 5,115,345
[45] Date of Patent: May 19, 1992

[54] ANTI-GLARE, ANTI-STATIC VIDEO MONITOR VISOR

[76] Inventors: Michael G. Hobson, 545 Shell Pkwy. #3212, Redwood City, Calif. 94065; Maurice K. Nelson, 305 Glen Ridge Way, El Dorado Hills, Calif. 95630

[21] Appl. No.: 406,284

[22] Filed: Sep. 12, 1989

[51] Int. Cl.⁵ .................................. G02B 27/00
[52] U.S. Cl. ............................ 359/601; 359/507; 358/255; 106/271
[58] Field of Search ............ 359/601, 608, 609, 507, 359/894; 358/245, 247, 252, 255; 55/5, 262, 267; 106/271; 360/133; 252/511

[56] References Cited

U.S. PATENT DOCUMENTS

| | | | |
|---|---|---|---|
| 3,783,405 | 1/1974 | Manoukian | 359/507 |
| 4,548,740 | 10/1985 | von Tomkewitsch et al. | 252/511 |
| 4,569,572 | 2/1986 | Kopich | 359/601 |
| 4,618,222 | 10/1986 | Eisenberg | 359/507 |
| 4,633,324 | 12/1986 | Giulie | 358/255 |
| 4,784,468 | 11/1988 | Tierney | 359/601 |
| 4,828,621 | 5/1989 | Siamon | 106/271 |
| 4,845,583 | 7/1989 | Zimmerman et al. | 360/133 |

*Primary Examiner*—Loha Ben
*Attorney, Agent, or Firm*—Bernhard Kreten

[57] ABSTRACT

A visor which is formed from a blank of material capable of being oriented such that a portion projects from a top wall of a video terminal and side portions extend from side walls, thereby providing a shelf type projection circumscribing a portion of the screen on a video display. The blank includes a top surface and a bottom surface, and the bottom surface is provided with a coating which has anti-static properties in order to reduce static and dust on the screen. The effect of the projection is that it reduces monitor glare in lighted rooms thereby reducing eyestrain and increases work privacy.

20 Claims, 1 Drawing Sheet

ANTI-GLARE, ANTI-STATIC VIDEO MONITOR VISOR

BACKGROUND OF THE INVENTION

The following invention relates generally to instrumentalities which are adapted to reduce glare from unwanted light sources that adversely affects viewability of a cathode ray tube. In addition, the device reduces the affinity for such a tube to attract dust on its surface by electrostatic attraction. Moreover, the device restricts visual access to the CRT.

Television sets, computer monitors, oscilloscopes or the like frequently rely upon luminescence of a target screen which is then excited by an electron gun producing a visual image on the screen. Since the envelope of the cathode ray tube relies in part on electrical stimulation, an electrostatic bias exists on the display surface of the screen. As a result, the exterior surface of such a screen displays an affinity for dust.

In addition, because the efficiency of a CRT relies upon the electrical discharge that exists when the screen is stimulated, brightness of the screen can be degraded by other light sources and reflection from brighter light which manifests a form of glare on the screen, all of which creates eye strain. To the extent possible, one tends to divert strong light from direct contact with the screen when it is being viewed in order to provide maximum contrast.

Once such a screen has been sufficiently "tuned" such that it is relatively dust-free and ambient light has been controlled, the clarity of the depiction on the screen will have been enhanced. Sometimes, however, this is undesirable since confidential or sensitive material may be displayed on the screen which is not to be viewed by passers-by.

To date, no known instrumentality exists which has addressed all of these needs and yet provides an attractive display upon which indicia or some form of advertising can be displayed.

SUMMARY OF THE INVENTION

The instant invention provides solutions to all of the above mentioned short comings by providing a device which readily retrofits on an existing cathode ray tube (CRT). In its essence, the device is formed as a blank having top and bottom surfaces, with the bottom surface closest to the CRT. The blank is oriented such that a leading edge projects over a top wall adjacent a top edge of the CRT display, thereby providing a projection or overhang extending beyond the plane defined by the screen of the CRT. The blank is provided with scorelines which allow side portions of the blank to be folded down on side walls of the CRT thereby providing a further form of barrier protecting the CRT. A surface of the device closest to the CRT is provided with an anti-static coating which alters the path of dust and other light debris heretofore deposited on the screen due to electrostatic attraction. A further form of barrier is afforded by the blank being interposed between the screen and distracting light sources, such as overhead fluorescent systems or light coming in from windows on any side of the CRT.

OBJECTS OF THE INVENTION

Accordingly, it is a primary object of the present invention to provide a novel and useful anti-glare, anti-static video monitor visor according to the present invention.

A further object of the present invention is to provide a device as characterized above which is extremely easy to install, lends itself to mass production techniques and is extremely effective in use.

A further object of the present invention is to provide a device of the character described above which enhances the privacy of a person using the CRT with the visor installed by providing a visual barrier making access by third parties more difficult.

Viewed from one vantage point, it is an object of the present invention to provide a visor for a video monitor having an output screen, comprising in combination: a blank of material having a top and bottom surface and a leading edge, the bottom surface configured to rest on a portion of the monitor and include a shelf-like projection extending forward of the monitor defined by the plane of the video screen.

A further object, when viewed from a second vantage point, is to provide a visor for a display screen of a cathode ray tube (CRT) which screen electrostatically attracts dust, comprising in combination: a planar blank having a top surface and a bottom surface, the bottom surface provided with means to minimize electrostatic attraction of dust to the screen, and means on the blank to allow deformation of the blank to conform to the profile of the CRT.

Viewed from yet another vantage point, an object of the present invention is to provide a method for blocking dust and glare from a viewing surface of a CRT, or the like, comprising the steps of: treating a blank with anti-static means on a surface adjacent the CRT, forming the blank to conform to a top wall and side walls of the CRT, and placing the blank on the CRT such that a portion projects over the viewing surface.

These and other objects will be made manifest when considering the following detailed specification when taking in conjunction with the appended drawing figures.

DESCRIPTION OF THE PREFERRED EMBODIMENTS

Figure 1:
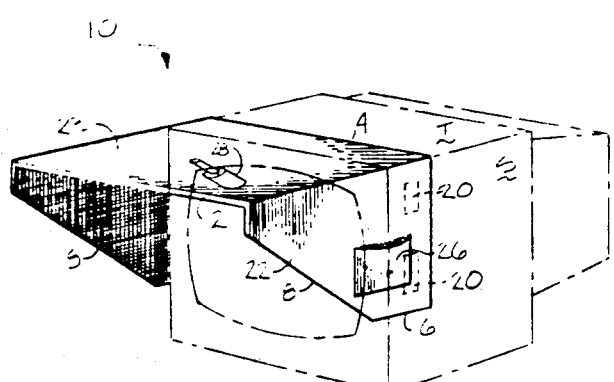
FIG. 1 is a perspective view of the apparatus according to the present invention shown in its intended environment.
Figure 2:
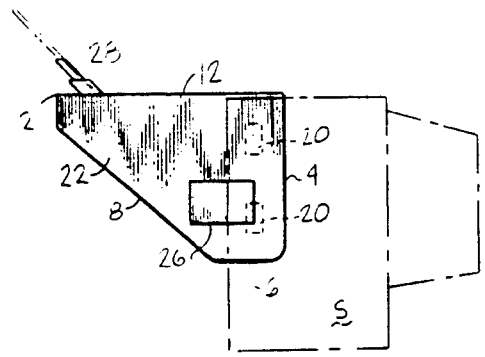
FIG. 2 is a side view of that which is shown in FIG. 1.
Figure 3:
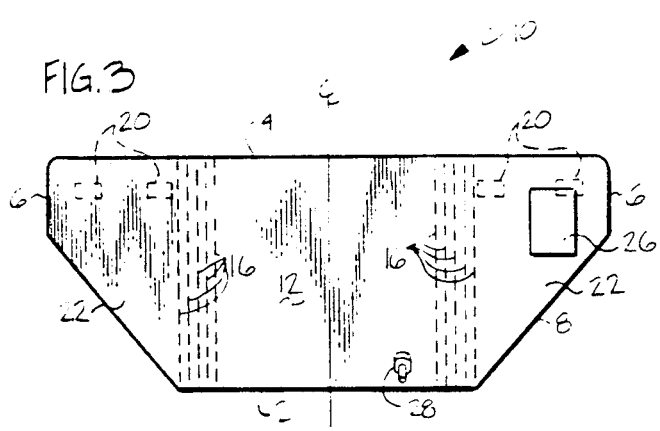
FIG. 3 is a top plan view of the apparatus in an undeployed, stored configuration.
Figure 4:
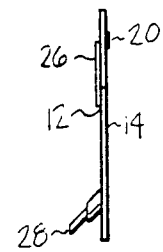
FIG. 4 is a side view of that which is shown in FIG. 3.
Figure 5:
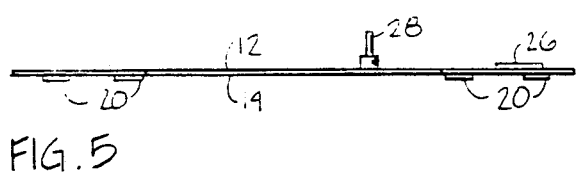
FIG. 5 is a front view of that which is shown in FIG. 3.
Figure 6:
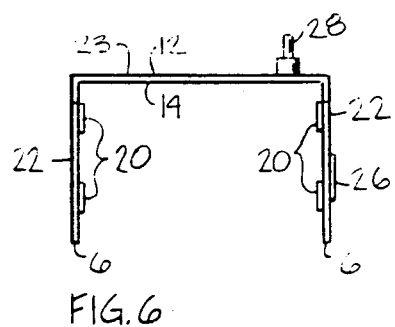
FIG. 6 is a front view of the apparatus shown in an orientation about to be placed on a video CRT.
Figure 7:
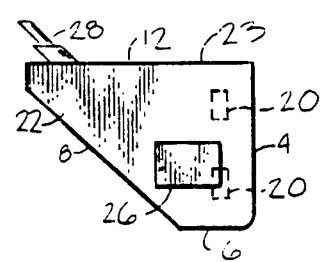
FIG. 7 is a side view of that which is shown in FIG. 6.

Referring to the drawings now, wherein like reference numerals refer to like parts, reference numeral 10 is directed to the visor according to the present invention. In general the antiglare, anti-static video monitor visor 10 is formed from a blank of corrugated cardboard having one surface treated with a coating which alters that surface's ability to attract or repel electrostatically sensitive dust particles to thereby define an anti-static coating. In essence, the coating can operate in one of several ways.

In one form of the invention, the coating can "cancel" the effect of an ion population on the CRT viewing screen which serves as a dust attractant. Thus, the coating can be a polarity opposite from the static charge on the CRT screen. This provides a net effect of electrostatic "neutrality" when considering the zone circumscribing the visor and screen. No influence would be exerted upon dust passing in the immediate vicinity.

A second way in which the coating can keep the screen relatively dust-free is to provide a strong attraction for the dust which is greater than the attraction provided by the screen. This would entail providing the coating with an ionic charge of the same sign but of greater magnitude than the condition of the screen when it has been stimulated.

In a preferred form of the invention, the coating applied to the device 10 is characterized as a conductive coating. To be effective it must provide a surface resistance of $10^{10}-10^{13}$ ohms per square meter when applied, and must have a static decay rate under 120 seconds. Typically, the coating appears as a black colored emulsion having acrylic solids contained therewithin and a pH of 8.5–9.5. One such coating is called "Resistocoats", available from Michelman, Inc., of Cincinnati, Ohio.

Referring to the drawing figures, the visor 10 includes a blank formed with a top surface 12 and a bottom surface 14. It is the bottom surface that receives the coating mentioned above. It is found that conventional corrugated cardboard is an adequate substrate upon which this coating can be placed.

The blank includes a trailing rear edge 4, a front leading edge 2, and side edges 6 extending therebetween. As thus far described, the device would be a substantially rectangular blank. But the side edges 6 as they extend from the rear edge 4 to the front edge 2 are provided with a truncated edge 8 cut at a 45 degree angle at about a distance ⅓ the entire width of the blank, as measured along a centerline between the rear and leading edges. Thus, the side edges 6 are approximately ⅓ the maximum width. Note the corners between the side and rear edges have been radiused. In addition, a plurality of scorelines 16 are provided parallel to side edges 6 and just inboard from where the truncated edge 8 connects with the leading edge 2. Pairs of scorelines 16 are on opposite sides of and equidistant from a centerline CL of the blank so that when configured such as shown in FIG. 1 by bending along a scoreline, a pair of downwardly depending wings 22 are formed. It is intended that when deployed the visor evolves into a three-sided structure having a top panel 23, and a pair of depending side wings 22 extending from the score lines. These side wings and top panel respectively overlap upon side walls S and a top wall T of a video display terminal.

When deployed in a stable position on the video monitor, a major portion of the blank is intended to project forwardly, above the video screen. This provides an overhang or shroud which effectively limits access or exposure of the screen to a plurality of distracting phenomena heretofore afflicting video display terminals. In order to reliably fasten the visor 10 to the monitor, a plurality of fasteners 20 are placed just inboard of the rear edge 4 and on the wings 22 of the visor. Thus these fasteners 20 will connect with side walls S of the monitor for reliable fastening. In one form of the invention, an adhesive can be the means for attachment. In another embodiment, a mechanical hook and loop fastener manufactured under the trademark Velcro can be utilized.

In use and operation, a major portion of the visor, approximately 50%–65%, projects forwardly, over the top and side walls of the monitor. The thus-formed shelf, which overhangs and projects thereover, provides a barrier against distracting sources of ambient light. The visor also provides a physical barrier making it difficult for dust to migrate under the projection towards the screen. This effect is further enhanced by placing the coating mentioned above on the bottom visor surface 14 which repels dust particles away from the screen. In addition, the contour of the sidewings including the truncated edge 8 can be modified for more severe angles than that which has been shown in the drawings so that an observer cannot discern what is on the screen from looking along a side thereof. This would have particular utility in classroom or examination environments.

Thus, a device has been provided which can fit monitors with screens having different diameters because of its adaptability via the scorelines. In addition, the overhanging projection reduces monitor glare when used in a room that is illuminated thereby reducing eyestrain. The top and side surfaces of the visor are appropriately configured to support indicia such as advertising thereon.

In addition, a support means can be provided to carry other articles. Thus, a pocket 26 and a pen holder 28 are shown in FIG. 1 to further enhance the flexibility of the system. The pocket 26 can be used to retain computer diskettes or other material.

Moreover, having thus described the invention, it should be apparent that numerous structural modifications and adaptations may be resorted to without departing from the scope and fair meaning of the instant application as defined here and below by the claims and as defined generally here and above.

We claim:

1. A visor of a video monitor having an output video screen, comprising, in combination:
    said visor having a top surface and a bottom surface and a leading edge.
    said bottom surface configured to rest upon a portion of the video monitor and include a shelf-like projection extending forward of the video monitor with respect to a plane defined by the output video screen,
    said visor including an anti-static coating on said bottom surface to provide anti-static means which offsets an inherent tendency of the output video screen, when the video monitor is operated, to exhibit an affinity for dust particles through electrostatic attraction.

2. The visor of claim 1 wherein said anti-static coating has a surface resistance in the range of $10^{10}-10^{13}$ ohms per square meter.

3. The visor of claim 2 wherein said visor includes a trailing edge and side edges thereby defining in conjunction with said leading edge and top and bottom surfaces a substantially rectangular construct, and on each side of said visor a truncated edge is provided between each said side edge and said leading edge.

4. The visor of claim 3 including a plurality of scorelines extending from said leading edge to said trailing edge, said scorelines uniformly disposed about a centerline intermediate said side edges, said scorelines defining areas of distortion for providing downwardly depending wings to straddle side walls of the monitor.

5. The visor of claim 4 including removable fastening means extending between said visor and the video monitor for removably attaching said visor to the monitor.

6. The visor of claim 1 wherein said coating has a static decay rate of less than 120 seconds.

7. A visor of a cathode ray tube (CRT) having a display screen, which screen electrostatically attracts dust when the screen is in use, comprising, in combination:

said visor having a top surface and a bottom surface, a portion of said visor's bottom surface removeably supported on said cathode ray tube, said bottom surface having means thereon to negate electrostatic attraction of dust to the screen.

8. The visor of claim 7 wherein said visor is defined by a generally linear trailing edge, a pair of side edges extending at right angles to said trailing edge, a pair of truncated edges extending from said side edges forwardly, and a leading edge interconnecting said truncated edges.

9. The visor of claim 8 wherein an area where said truncated edges communicate with said leading edge includes a plurality of rearwardly extending scorelines spaced symmetrically from a centerline defined by a line equidistant between said side edges, said scorelines adapted to operate in pairs whereby said visor is folded along said scorelines providing downwardly depending wings to straddle side surfaces of a housing associated with said cathode ray tube.

10. The visor of claim 9 wherein said downwardly depending wings include fasteners on a surface adjacent to the CRT, for removable attachment of said visor to the CRT.

11. The visor of claim 10 wherein said visor is oriented such that a major portion overhangs and projects outwardly from the CRT, and said bottom surface, provided with electrostatic negating means, provides greater repelling of ambient dust.

12. The visor of claim 11 wherein said electrostatic negating means is configured as a coating placed on said bottom surface, and operates by neutralizing the inherent electrostatic affinity the CRT has for dust.

13. The visor of claim 12 wherein said top surface of said visor provides a host medium for indicia to be printed thereon.

14. A method for blocking dust and glare from a viewing surface of a CRT, comprising, in combination, the steps of:

treating a visor with anti-static means on a surface to be placed adjacent the CRT, forming the visor to conform to a top wall and side walls of the CRT, and placing the visor on the CRT such that a portion of the visor projects about the periphery of the viewing surface.

15. The method of claim 14 wherein the step of treating the visor with anti-static means is done by placing a coating of material on a bottom surface of the visor which has a surface resistance of $10^{10}-10^{13}$ ohms per square meter.

16. The method of claim 15 wherein the step of forming the visor is done by providing a substantially linear trailing edge, a pair of side edges disposed at right angles with respect to said trailing edge, and a front edge connecting said side edges by forming a truncated edge therebetween on each side of the visor, and altering the dimension of the thus formed visor by providing scorelines between said leading and trailing edges.

17. The method of claim 16 wherein the step of forming the visor further includes the steps of forming scorelines in pairs equidistant from a centerline of the visor as determined by a line equidistant between said side edges, and bending the visor along a pair of such scorelines to provide a top panel portion of the visor which conforms to the top wall of the CRT and wing portions which rest against side walls of the CRT.

18. The method of claim 17 further including the step of affixing the portion of the visor which contacts the side wall to the CRT by means of removable fastening means.

19. The method of claim 18 further including the step of orienting the visor with respect to the CRT to provide an overhanging projection or shelf which extends approximately ⅝ out from the CRT as measured by the width of the visor taken along the centerline.

20. The method of claim 19 further including the step of placing indicia on a top surface of the visor.

* * * * *